(12) United States Patent
Fadell

(10) Patent No.: US 8,001,400 B2
(45) Date of Patent: Aug. 16, 2011

(54) POWER CONSUMPTION MANAGEMENT FOR FUNCTIONAL PRESERVATION IN A BATTERY-POWERED ELECTRONIC DEVICE

(75) Inventor: Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 654 days.

(21) Appl. No.: 11/565,890

(22) Filed: Dec. 1, 2006

(65) Prior Publication Data

US 2008/0133956 A1 Jun. 5, 2008

(51) Int. Cl.
*G06F 1/26* (2006.01)
*G06F 1/32* (2006.01)

(52) U.S. Cl. ........ 713/320; 713/300; 713/323; 713/324; 713/330

(58) Field of Classification Search .......... 713/300, 713/320, 323, 324, 330
See application file for complete search history.

(56) References Cited

U.S. PATENT DOCUMENTS

| | | | |
|---|---|---|---|
| 4,673,861 A | 6/1987 | Dubovsky et al. | |
| 4,965,738 A | 10/1990 | Bauer et al. | |
| 5,103,156 A | 4/1992 | Jones et al. | |
| 5,150,031 A | 9/1992 | James et al. | |
| 5,339,445 A * | 8/1994 | Gasztonyi | 713/324 |
| 5,371,456 A | 12/1994 | Brainard | |
| 5,402,055 A | 3/1995 | Nguyen | |
| 5,471,128 A | 11/1995 | Patino et al. | |
| 5,498,950 A | 3/1996 | Ouwerkerk | |
| 5,514,945 A | 5/1996 | Jones | |
| 5,596,260 A | 1/1997 | Moravec et al. | |
| 5,602,455 A | 2/1997 | Stephens et al. | |
| 5,648,712 A | 7/1997 | Hahn | |
| 5,754,027 A | 5/1998 | Oglesbee et al. | |
| 5,845,142 A | 12/1998 | Hayasaka | |
| 5,845,217 A | 12/1998 | Lindell et al. | |
| 5,955,869 A | 9/1999 | Rathmann | |
| 5,958,058 A * | 9/1999 | Barrus | 713/320 |
| 5,998,972 A | 12/1999 | Gong | |
| 6,007,372 A | 12/1999 | Wood | |
| 6,025,695 A | 2/2000 | Friel et al. | |

(Continued)

FOREIGN PATENT DOCUMENTS

EP 1 524 829 4/2005

(Continued)

OTHER PUBLICATIONS

Benini, Battery-Driven Dynamic Power Management, Mar.-Apr. 2001, IEEE.*

(Continued)

*Primary Examiner* — Thomas Lee
*Assistant Examiner* — Jaweed A Abbaszadeh
(74) *Attorney, Agent, or Firm* — Beyer Law Group LLP

(57) ABSTRACT

Methods and apparatus for managing power consumption in a multi-function electronic device powered by one or more batteries are provided. In one embodiment, when the power available from the one or more batteries is diminished (e.g., below a certain threshold), management of power consumption in a battery-powered electronic device (e.g., a portable electronic device) can operate or be operated to preserve one or more functions supported by the electronic device. For example, the one or more functions can be preserved by: (i) alerting a user that they should act to avoid usage of other functions that are not being preserved, and/or (ii) disabling (e.g., automatically) one or more of the other functions that are not being preserved.

8 Claims, 7 Drawing Sheets

U.S. PATENT DOCUMENTS

| | | | |
|---|---|---|---|
| 6,125,455 | A | 9/2000 | Yeo |
| 6,130,518 | A | 10/2000 | Gabehart et al. |
| 6,152,778 | A | 11/2000 | Dalton |
| 6,169,387 | B1 | 1/2001 | Kaib |
| 6,178,514 | B1 | 1/2001 | Wood |
| 6,184,652 | B1 | 2/2001 | Yang |
| 6,184,655 | B1 | 2/2001 | Malackowski |
| 6,204,637 | B1 | 3/2001 | Rengan |
| 6,211,581 | B1 | 4/2001 | Farrant |
| 6,211,649 | B1 | 4/2001 | Matsuda |
| 6,222,347 | B1 | 4/2001 | Gong |
| 6,252,380 | B1 | 6/2001 | Koenck |
| 6,261,109 | B1 | 7/2001 | Liu et al. |
| 6,271,605 | B1 | 8/2001 | Carkner et al. |
| 6,283,789 | B1 | 9/2001 | Tsai |
| 6,316,916 | B2 | 11/2001 | Bohne |
| 6,353,894 | B1 | 3/2002 | Pione |
| 6,392,414 | B2 | 5/2002 | Bertness |
| 6,489,751 | B2 | 12/2002 | Small et al. |
| 6,522,118 | B1 | 2/2003 | Barcelo et al. |
| 6,526,516 | B1 | 2/2003 | Ishikawa et al. |
| 6,614,232 | B2 | 9/2003 | Mukai |
| 6,658,577 | B2 | 12/2003 | Huppi et al. |
| 6,747,859 | B2 | 6/2004 | Walbeck et al. |
| 6,799,226 | B1 | 9/2004 | Robbin et al. |
| 6,969,970 | B2 | 11/2005 | Dias et al. |
| 6,995,963 | B2 | 2/2006 | Fadell et al. |
| 7,054,981 | B2 | 5/2006 | Fadell et al. |
| 7,057,372 | B2 * | 6/2006 | Chen et al. .................... 320/106 |
| 7,233,127 | B2 * | 6/2007 | Chen et al. .................... 320/106 |
| 7,366,921 | B2 * | 4/2008 | Ranganathan ................ 713/300 |
| 7,389,439 | B2 * | 6/2008 | Yoon et al. .................... 713/323 |
| 7,598,702 | B2 * | 10/2009 | Walrath .......... 320/107 |
| 7,653,825 | B1 * | 1/2010 | White et al. .................. 713/322 |
| 2001/0003205 | A1 | 6/2001 | Gilbert |
| 2001/0005641 | A1 | 6/2001 | Matsumoto et al. |
| 2001/0006884 | A1 | 7/2001 | Matsumoto |
| 2002/0156949 | A1 | 10/2002 | Kubo et al. |
| 2002/0189426 | A1 | 12/2002 | Hirade et al. |
| 2003/0076301 | A1 | 4/2003 | Tsuk et al. |
| 2003/0095096 | A1 | 5/2003 | Robbin et al. |
| 2003/0110403 | A1 | 6/2003 | Crutchfield et al. |
| 2003/0131274 | A1 * | 7/2003 | Mizuyabu et al. ............ 713/324 |
| 2003/0135769 | A1 * | 7/2003 | Loughran .................... 713/310 |
| 2003/0158609 | A1 * | 8/2003 | Chiu ............................. 700/22 |
| 2003/0229490 | A1 | 12/2003 | Etter |
| 2004/0069122 | A1 | 4/2004 | Wilson |
| 2004/0094018 | A1 | 5/2004 | Ueshima et al. |
| 2004/0117518 | A1 | 6/2004 | Fadell et al. |
| 2004/0198436 | A1 | 10/2004 | Alden |
| 2004/0224638 | A1 | 11/2004 | Fadell et al. |
| 2004/0225804 | A1 | 11/2004 | Leete |
| 2004/0268166 | A1 * | 12/2004 | Farkas et al. .................. 713/320 |
| 2005/0015254 | A1 | 1/2005 | Beaman |
| 2005/0085277 | A1 * | 4/2005 | Chen et al. .................... 455/572 |
| 2005/0097376 | A1 | 5/2005 | Weinberger et al. |
| 2005/0268131 | A1 * | 12/2005 | Matsunobu ................ 713/323 |
| 2006/0075268 | A1 * | 4/2006 | Kim et al. .................... 713/300 |
| 2006/0143483 | A1 * | 6/2006 | Liebenow .................... 713/300 |
| 2006/0187073 | A1 | 8/2006 | Lin et al. |
| 2006/0195206 | A1 | 8/2006 | Moon et al. |
| 2006/0197755 | A1 | 9/2006 | Bawany |
| 2006/0214638 | A1 * | 9/2006 | Chen et al. .................... 320/132 |
| 2006/0221788 | A1 | 10/2006 | Lindahl et al. |
| 2006/0274905 | A1 | 12/2006 | Lindahl |
| 2007/0067656 | A1 * | 3/2007 | Ranganathan et al. ....... 713/320 |
| 2007/0185551 | A1 | 8/2007 | Meadows et al. |
| 2007/0205745 | A1 * | 9/2007 | Chen et al. .................... 320/136 |

FOREIGN PATENT DOCUMENTS

| | | |
|---|---|---|
| GB | 2 373 886 | 10/2002 |
| JP | 2001-69165 A | 3/2001 |
| WO | WO 99/26330 | 5/1999 |
| WO | WO 00/39907 | 7/2000 |
| WO | WO 03/073688 | 9/2003 |
| WO | WO2006/030368 | 3/2006 |

OTHER PUBLICATIONS

International Search Report dated Apr. 22, 2008 n PCT Application No. PCT/US2007/085668.

Written Opinion dated Apr. 22, 2008 n PCT Application No. PCT/US2007/085668.

European Office Action dated Jul. 30, 2010 in EP Application No. 07864834.2.

"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.

"Cables to Go", download Oct. 16, 2001, http://www.cablestogo.com/product.asp?cat%5Fid=601&sku=27028.

"ExpressBus™ FU010 User Guide Packing Checklist", Belkin Components.

"FireWire Connector", downloaded Oct. 16, 2001, wysiwyg://76/http://developer.apple.com/ ...es/Macintosh_CPUs-G3/ibook/ibook-27.html.

"FireWire", downloaded Oct. 16, 2001, wysiwyg://42/http://developer.apple.com/hardware/FireWire.

"How to Connect Your Computer, PC Hardware", downloaded Oct. 16, 2001, http:///www.scar.utoronto.ca/~ccweb/faculty/connect-howto.html.

"IEEE 1394/USB Comparison", downloaded Oct. 16, 2001, www.genitech.com.au/LIBRARY/TechSupport/infobits/firewire_vs_usb.htm.

"Introduction to Public Key Cryptography," Oct. 9, 1998, printed from http://developer.netscape.com/docs/manuals/security/pkin/contents.htm on Oct. 6, 2004.

"LTC4055—USB Power Controller and Li-Ion Linear Charger," Linear Technology.

"Making USB Work", downloaded Oct. 16, 2001, PC Magazine: PC Tech (Making USB Work) wysiwyg://55/http://www.zdnet.com/pcmag/pctech/content/18/04/tu1804.001.html.

"PMC FW2 IEEE1394 FireWire Controller", downloaded Oct. 16, 2001, http://www.bvmltd.co.uk/PMCfw2ds.html.

"Why FireWire is Hot!Hot!Hot!", downloaded Oct. 16, 2001, "Impact.FireWire.SideBar", http://www.vxm.com/21R.35.html.

U.S. Appl. No. 10/125,893, filed Apr. 18, 2002 entitled Power Adapters for Powering and/or Charging Peripheral Devices.

Belkin iPod Voice Recorder, Product Specification Sheet, printed Jun. 16, 2004.

Brentrup, "Public Key Cryptography Demystified," Campus Technology, printed from http://www.campus-technology.com/article.asp?id=7626 on Oct. 6, 2004.

Charles Severance, "FireWire Finally Comes Home," Michigan State University, pp. 117-118, Nov. 1998 .

Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.

Ian Fried, "New FireWire to blaze faster trail", downloaded Oct. 16, 2001, CNET News.com, http://news.cnet.com/news/0-1006-200-6021210.html.

International Search Report in PCT application PCT/US05/024906 dated Mar. 15, 2006.

Menezes et al., "Handbook of Applied Cryptography," Identification and Entity Authentication, pp. 385-424.

Michael D. Johas Teener, "Understanding FireWire: The IEEE 1394 Standards and Specifications", downloaded Oct. 16, 2001, wysiwyg://9/http://www.chipcenter.com/networking/ieee1394/main.html.

Networking Tech Note, "1394 Standards and Specifications," 3 pgs.

Whittle, "Public Key Authentication Framework: Tutorial," First Principles Consulting, Jun. 2, 1996.

* cited by examiner

USAGE PREFERENCES

WHEN

○ MEDIA PLAYBACK TIME

○ AVAILABLE CALL TIME

IS LESS THAN

○ 60 MINUTES

○ 30 MINUTES

○ 15 MINUTES

WHEN

○ NOTIFY ME

○ DISABLE FUNCTION

○ MEDIA PLAYBACK

○ WIRELESS DATA NETWORK

FIG. 6

POWER CONSUMPTION MANAGEMENT FOR FUNCTIONAL PRESERVATION IN A BATTERY-POWERED ELECTRONIC DEVICE

BACKGROUND OF THE INVENTION

1. Field of the Invention

The present invention relates to battery-powered electronic devices and, more particularly, to managing battery consumption on a portable electronic device.

2. Description of the Related Art

Conventionally, portable electronic devices, such as cellular phones, portable digital assistants or portable media players, have provided visual clues regarding certain device status conditions. For example, battery-powered portable electronic devices frequently display a visual indication of battery status. The visual indication typically indicates the extent to which the battery is charged (i.e., battery level). Additionally, cellular phones often not only provide such a visual indication of battery level but also provide an auditory, periodic beeping sound while a call is in process to alert the user when the battery level is particularly low.

Unfortunately, however, these conventional indications of battery level are often ignored by users. Moreover, as portable electronic devices become more advanced, battery charge can be rapidly consumed without users being aware. Thus, there is a need for improved techniques to inform and assist users in managing consumption of available battery power on portable media players.

SUMMARY OF THE INVENTION

The invention pertains to management of power consumption in a multi-function electronic device powered by one or more batteries. In one embodiment, when the power available from the one or more batteries is diminished, management of power consumption in a battery-powered electronic device (e.g., portable electronic device) can operate or be operated to preserve one or more functions supported by the electronic device. For example, the one or more functions can be preserved by: (i) alerting a user that they should act to avoid usage of other functions that are not being preserved, and/or (ii) disabling (e.g., automatically) one or more of the other functions that are not being preserved. The management of power consumption can be guided by user participation (e.g., user preferences).

The invention can be implemented in numerous ways, including as a method, system, device, apparatus (including graphical user interface), or computer readable medium. Several embodiments of the invention are discussed below.

As a method for managing power consumption of an electronic device powered by a battery, the electronic device supporting a plurality of different functions, one embodiment of the invention can includes: operating the electronic device to provide one or more of the plurality of different functions; monitoring the battery of the electronic device to obtain battery status information; evaluating the battery status information based on one or more preference settings to produce evaluation results; and taking action at the electronic device based on the evaluation results.

As a computer readable medium including at least computer program code for managing power consumption of a portable electronic device powered by a battery, the portable electronic device supporting a plurality of different applications, one embodiment of the invention can include: computer program code for operating the portable electronic device to provide one or more of the plurality of different applications; computer program code for monitoring the battery of the portable electronic device to obtain battery status information; computer program code for evaluating one or more preference settings based on the battery status information to produce evaluation results; and computer program code for taking action at the portable electronic device based on the evaluation results.

As a multi-application handheld electronic device in which power management can be provided on an application basis, one embodiment of the invention can include: a display, a battery, a battery monitor configured to acquire battery status information from the battery, and a processor operatively connected to the battery monitor. The processor can be configured to receive the battery status information from the battery monitor, analyze the battery status information in relation to future power requirements of the plurality of applications associated with the multi-application handheld electronic device, and display a notification that certain future power requirements are at risk of not being adequately supported.

As a graphical user interface presented on a display associated with an electronic device to assist a user of the electronic device with providing a usage preference, one embodiment of the invention can include a usage preference area displayed on the display. The usage preference area can enable the user of the electronic device to input one or more attributes of one or more user preferences. The one or more user preferences can be used to provide management of power consumption by the electronic device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 6 illustrates a graphical user interface according to one embodiment of the invention.

DETAILED DESCRIPTION OF THE INVENTION

The invention pertains to management of power consumption in a multi-function electronic device powered by one or more batteries. In one embodiment, when the power available from the one or more batteries is diminished (e.g., below a certain threshold), management of power consumption in a battery-powered electronic device can operate or be operated to preserve one or more functions supported by the electronic device. For example, the one or more functions can be preserved by: (i) alerting a user that they should act to avoid usage of other functions that are not being preserved, and/or (ii) disabling (e.g., automatically) one or more of the other functions that are not being preserved. The management of power consumption can by guided be user participation (e.g., user preferences).

The invention is well suited for a portable electronic device that supports multiple functions. The ability to identify one or more functions over others allows the portable electronic device to operate intelligently in power limited circumstances. As a result, battery power can be utilized more consistently with user preferences so as to support more important functions.

In one embodiment, the invention is suitable for use with a portable electronic device having at least wireless voice communication capability and media playback capability. The portable electronic device can, for example, be a portable media device (e.g., digital music player or MP3 player) having wireless voice communications. In another embodiment, the portable electronic device can be a wireless communications device (e.g., cellular phone) having media playback capabilities. These portable electronic devices can also have other functions (e.g., applications), such as electronic calendars, electronic appointments, network browsers, network data transfers, VoIP applications, etc.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
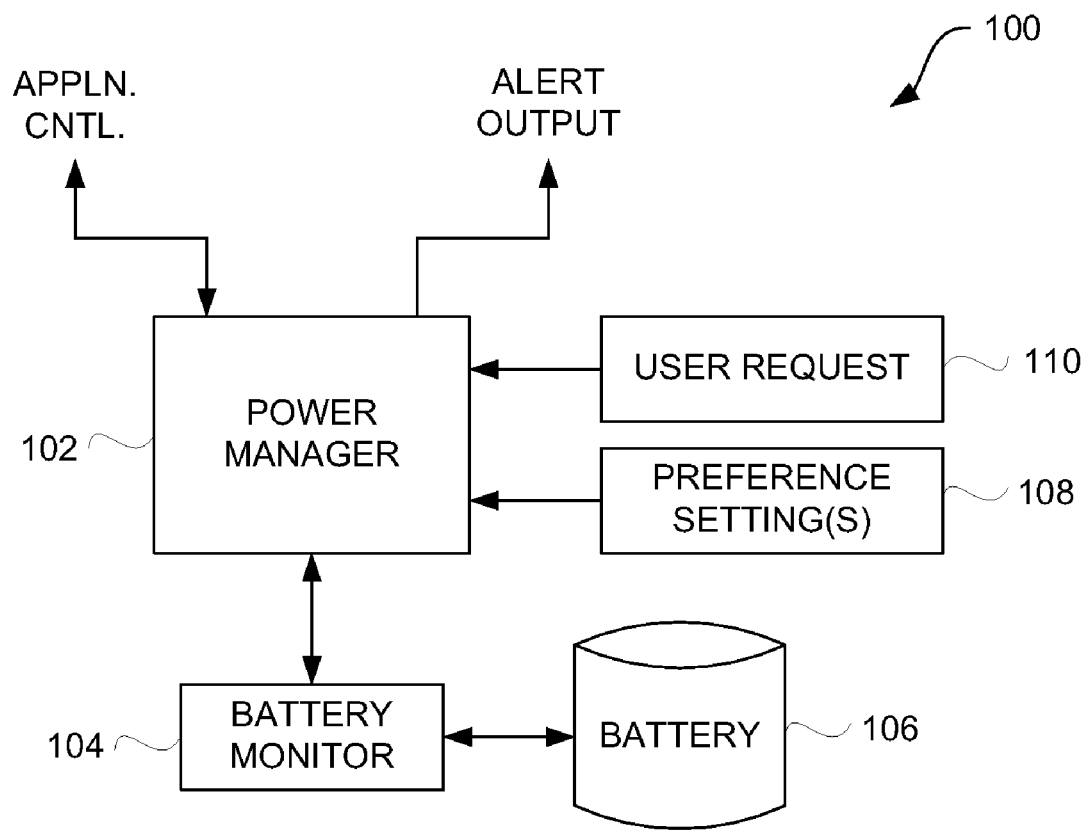
FIG. 1 is a block diagram of a power monitoring system according to one embodiment of the invention.

FIG. 1 is a block diagram of power monitoring system 100 according to one embodiment of the invention. Power monitoring system 100 can be inside an electronic device. Hence, power monitoring system 100 can serve to monitor one or more batteries that are used to power the electronic device. The one or more batteries can be inside the electronic device. Power monitoring system 100 can also be referred to as battery monitoring system 100.

Power monitoring system 100 can include power manager 102 that manages acquisition, storage and evaluation of battery information. Power manager 102 can also allow users to influence operation of power manager 102, such as through setting preferences. Still further, power manager 102 can control taking action dependent on the battery information.

Power manager 102 can couple to battery monitor 104. Battery monitor 104 can monitor the status of battery 106. The status of battery 106 can pertain to one or more attributes of battery 106. For example, one attribute of battery 106 is charge level, such as percentage charged. Other attributes of battery 106, which additionally or alternatively could be monitored, include temperature, voltage or current. Battery monitor 104 can monitor the status of battery 106 and can report battery status to power manager 102. Power manager 102 can then store the current status of battery 106. Power manager 102 can then analyze the current status of battery 106 in view of one or more preference setting(s) 108. Based on the analysis, power manager 102 can control (e.g., initiate) appropriate predetermined action(s). The action can, for example, be output (e.g., display) of a notification or disablement of one or more less important functions offered by the electronic device.

Preference settings 108 can be supplied to power manager 102 to affect how the status information for battery 106 is being used by power monitoring system 100. For example, preference settings 108 can influence the type of action that power manager 102 controls based on the status of battery 106. Preference settings 108 can also set or influence the criteria against which the status information is processed (e.g., compared). As one particular example, a preference setting can allow a user to disable a function of the electronic device when the status of battery 106 is diminished. As another particular example, a preference setting can allow a user to be notified when the status of battery 106 has been diminished such that the available usage time for a given function is below a determined level. User requests 110 can pertain to user inputs, such as input buttons, touch-sensitive surfaces, etc., that enable the user to request that power status (e.g., battery status) or power monitoring be provided. Power manager 102 can also receive user input via a user input device so as to, for example, set preference settings 108.

In general, the power monitoring by power monitoring system 100 can operate whenever the electronic device is being powered by battery 106. Alternatively, the power monitoring can be performed whenever battery 106 charge level is below a threshold level (e.g., 50% of its maximum charge level). As yet another alternative, power monitoring can be initiated by a user. A user can request the power status by a user input, such as by pressing a button on the electronic device or selecting a graphical user interface control. Alternatively or additionally, the electronic device itself can automatically output the battery status. For example, the battery status can be output when the battery status is undesirable (e.g., battery charge level low). As another example, the battery status can be output when an event occurs, such as when the device is turned on, when starting a function (e.g., application), when battery status is at a predetermined level, etc.

Although the electronic device is powered by a battery, in one embodiment, the electronic device can also at times utilize power from AC power supplied via a power cord coupled to an AC plug.

In one embodiment, the electronic device is a portable electronic device. In one implementation, the portable electronic device is a handheld electronic device. Often, portable electronic devices are handheld electronic devices that can be easily held by and within a single hand of a user. However, the invention can apply to electronic devices whether portable or not.

Figure 2:
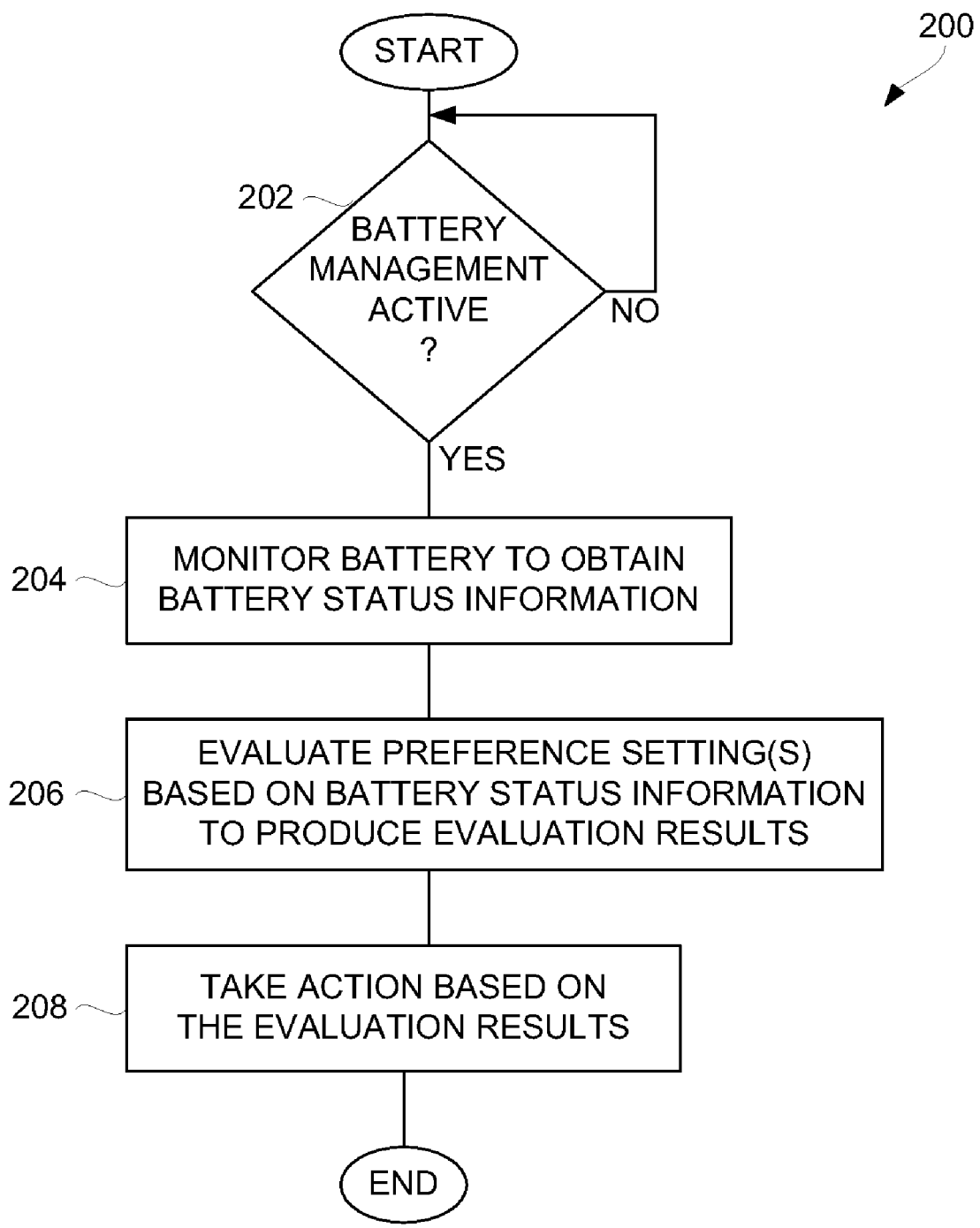
FIG. 2 is a flow diagram of a power consumption management process according to one embodiment of the invention.

FIG. 2 is a flow diagram of power consumption management process 200 according to one embodiment of the invention. Power consumption management process 200 is, for example, carried out by a portable electronic device that is capable of being powered by at least one battery.

Power consumption management process 200 can begin with decision 202 that determines whether battery management is active. When decision 202 determines that battery management is not active, power consumption management process 200 can wait until battery management is active. In other words, power management process 200 can be performed or invoked when battery management is active. For example, the battery management can be active when the portable electronic device is being powered by the at least one battery.

In any case, once decision 202 determines that battery management is active, the at least one battery can be monitored 204 to obtain battery status information. Battery status information can pertain to one or more characteristics of the at least one battery, such as battery charge level (or power level). Further, battery status information can be evaluated 206 based on the one or more preference settings to produce evaluation results. Then, an appropriate action is taken 208 based on the evaluation results. Action taken 208 can vary depending upon implementation or application. For example, in one implementation, action taken 208 can pertain to a notification. In another implementation, action taken 208 can pertain to disablement of one or more functions or features. Following action 208, power consumption management process 200 can end.

Advantageously, by informing the user of battery status as compared to preference settings, power consumption by the portable electronic device can be managed such that battery charge, when limited, is directed to the functions (e.g., applications) which are deemed more important. The portable electronic device can determine which functions are more important. User input, such as user preference(s), can be used to determine the functions that are most important.

Figure 3:
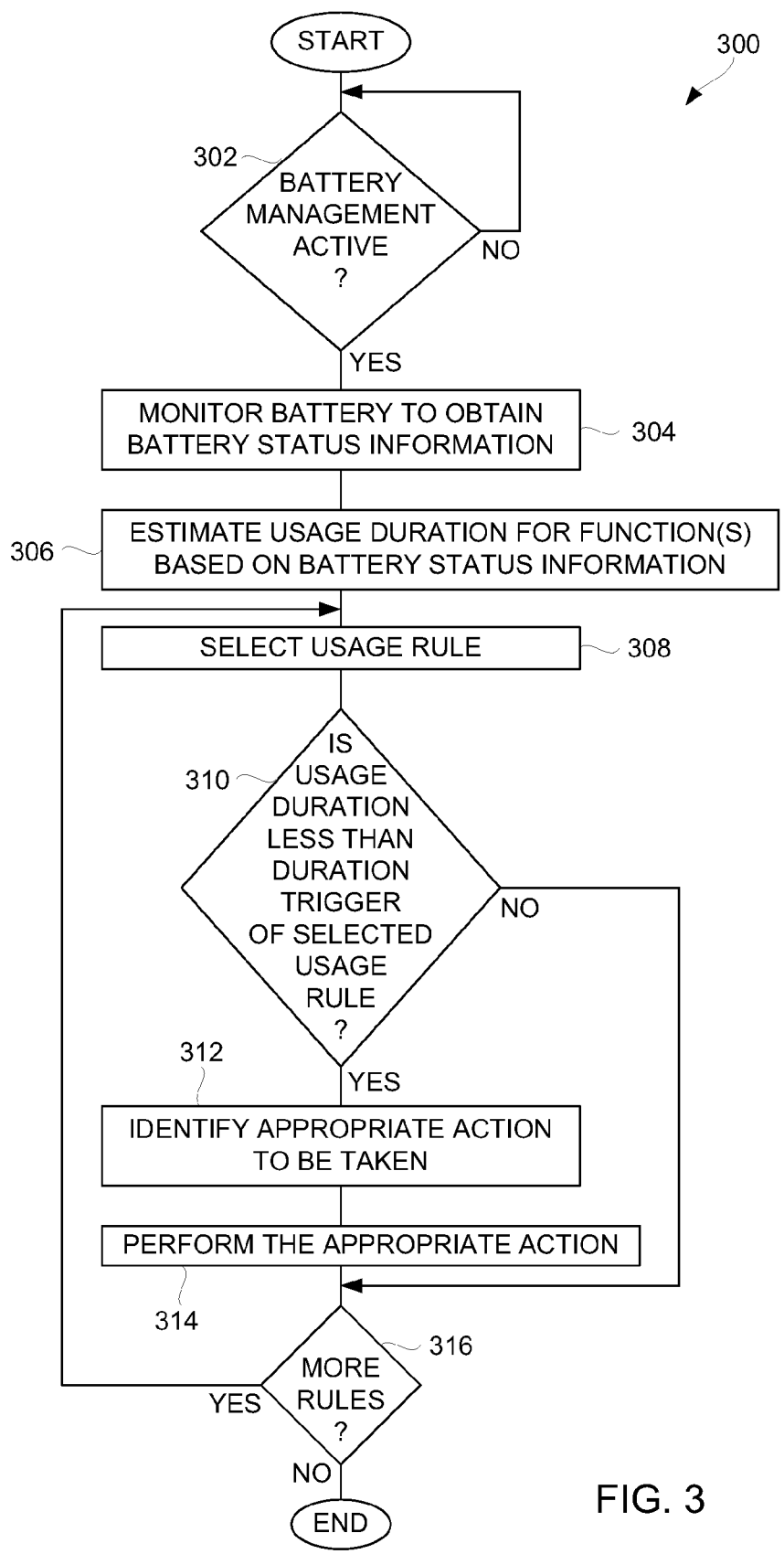
FIG. 3 is a flow diagram of a power consumption management process according to one embodiment of the invention.

FIG. 3 is a flow diagram of power consumption management process 300 according to one embodiment of the invention. Power consumption management process 300 can begin with decision 302. Decision 302 determines whether battery management is active on the portable electronic device. When decision 302 determines that battery management is not active, then power consumption management process 300 awaits its activation.

Once decision 302 determines that battery management has been activated, the battery utilized by the portable electronic device can be monitored 304 to obtain battery status information. Next, one or more usage durations for one or more functions (e.g., applications) of the portable electronic device can be estimated 306 based on the battery status information. The usage durations pertain to durations of time for which certain functions can be carried out on the portable electronic device given the current state of the battery. In other words, a usage duration can be an estimate of the duration of time for which the portable electronic device, given its current battery status, can further provide the associated function.

Additionally, the portable electronic device can be configured to provide one or more usage rules. The rules can utilize one or more duration triggers to determine whether the corresponding usage rules should be applied. The power consumption management process 300 can perform one or more usage rules in view of the usage duration that has been estimated 306 for one or more functions of the portable electronic device. In this regard, a usage rule can be selected 308. Here, selection 308 can be from one of a set of one or more usage rules that have been configured for use on the portable electronic device. Next, decision 310 can determine whether the usage duration is less than the duration trigger of the selected usage rule. When decision 310 determines that the usage duration is less than the duration trigger of the selected usage rule, then an appropriate action to be taken can be identified 312. The appropriate action to be taken can be specified by the selected usage rule. After the appropriate action to be taken has been identified 312, appropriate action can be performed 314.

Thereafter, decision 316 determines whether more usage rules remain to be processed. When decision 316 determines that more usage rules are to be processed, power consumption management process 300 returns to repeat action 308 so that another usage rule can be selected and similarly processed. Alternatively, when decision 316 determines that there are no more usage rules to be processed, power consumption management process 300 ends.

Figure 4:
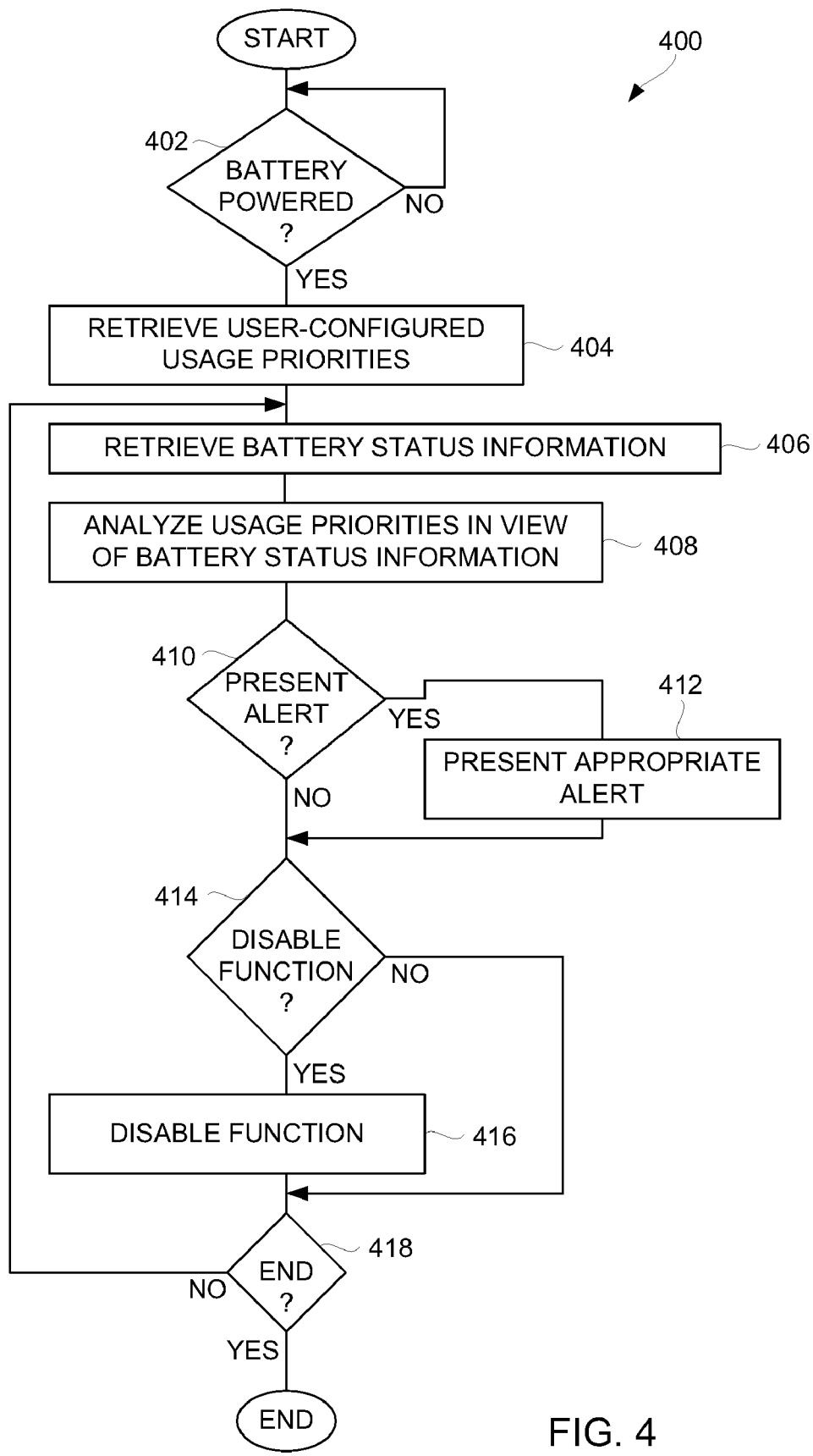
FIG. 4 is a flow diagram of a power consumption management process according to one embodiment of the invention.

FIG. 4 is a flow diagram of power consumption management process 400 according to one embodiment of the invention. Power consumption management process 400 is, for example, performed by a portable electronic device. The portable electronic device is capable of being powered by at least one battery.

Power consumption management process 400 can begin with decision 402. Decision 402 can determine whether the portable electronic device is being powered by the at least one battery. When decision 402 determines that the portable electronic device is not being powered by the at least one battery, then power consumption management process 400 is deferred until the portable electronic device is being powered by the at least one battery.

Once decision 402 determines that the portable electronic device is being powered by at least one battery, power consumption management process 400 is effectively invoked. In one embodiment, power consumption management process 400 could be performed in cases in which not only is the portable electronic device being powered by the at least one battery but also the state of the battery is deemed to be diminished. In other words, in one embodiment, only when the battery capacity has been substantially depleted is power consumption management process 400 performed.

In any case, when power consumption management process 400 is performed, user-configured usage priorities can be retrieved 404. In one embodiment, the usage priorities are implemented by one or more usage rules. The usage priorities can vary with implementation. In one example, the usage priority signals that a particular function (e.g., application) is to be preferred in situations where the state of the battery is diminished. The electronic device could take whatever action it deems appropriate to conserve battery power to preserve the particular function having priority. In another example, the usage priority can provide a specific rule that is automatically evaluated by the portable electronic device and used to invoke user-requested actions on the electronic device that act or assist to reduce battery power consumption so that battery capacity is more likely to be available for one or more higher priority functions (e.g., applications). In one embodiment, a graphical user interface can assist a user in specifying usage priorities.

Next, battery status information can be retrieved 406. Typically, the portable electronic device will include a battery monitor that will acquire the battery status information. The usage priorities can then analyzed 408 in view of the battery status information. The usage priorities can, in one embodiment, specify actions to be taken based on conditions that are compared with the battery status information. The actions to be taken, for example, can pertain to an alert or can pertain to disabling one or more functions.

Hence, after usage priorities are analyzed 408, decision 410 can determine whether an alert is to be provided. When decision 410 determines that an alert is to be provided, an appropriate alert can be presented 412. In one embodiment, the appropriate alert can be presented on a display associated with the portable electronic device. In another embodiment, the appropriate alert can be presented 412 by an audio output provided by the portable electronic device. Following the action 412, as well as following decision 410 when an alert is not be presented, decision 414 can determine whether a function is to be disabled. When decision 414 determines that a function is to be disabled, the function is then disabled 416. On the other hand, when decision 414 determines that a function is not to be disabled, action 416 can be bypassed.

Following action 416 or its being bypassed, decision 418 can determine whether power consumption management process 400 should end. When decision 418 determines that the power consumption management process 400 should not end, power consumption management process 400 can return to repeat the action 406 and subsequent blocks so that the power consumption management can continue. Alternatively, when decision 418 determines that power consumption management process 400 should end, then power consumption management process 400 ends.

Figure 5:
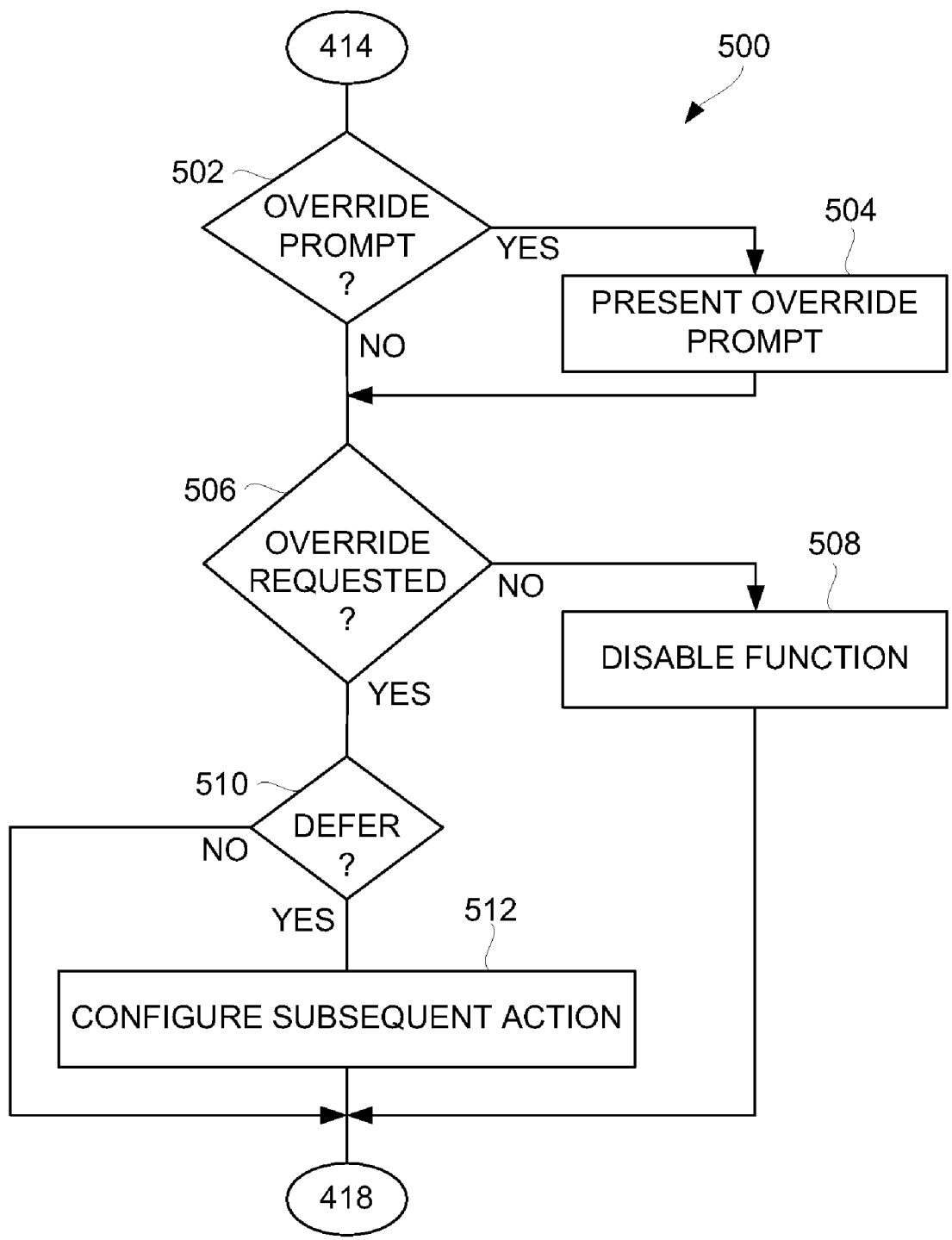
FIG. 5 is a flow diagram of a disable override process according to one embodiment of the invention.

FIG. 5 is a flow diagram of disable override process 500 according to one embodiment of the invention. Disable override process 500 can, for example, be used in place of action 416 of FIG. 4. In one embodiment, disable override process 500 can thus follow from the action 414 of power consumption management process 400 illustrated in FIG. 4. Instead of directly disabling a function of the portable electronic device, disable override process 500 allows the user of the portable electronic device to be permitted to override the disable action.

Disable override process 500 can begin with decision 502 that determines whether an override prompt is to be provided. When decision 502 determines that an override prompt is to be provided, an override prompt can be presented 504. The override prompt can be presented 504 in a visual and/or audio manner. For example, the override prompt can be displayed on a display associated with the portable electronic device, or the override prompt can be output to a speaker associated with the portable electronic device. Following action 504 (as well as following decision 502 when an override prompt is not to be provided), decision 506 determines whether an override has been requested. When decision 506 determines that an override has not been requested, then the function is disabled 508. Alternatively, when decision 506 determines that an override has been requested, decision 510 determines whether the disabling of the function that is being overridden should be deferred. When decision 510 determines that the function being disabled should be deferred, then a subsequent action can be configured 512. The subsequent action can be an alert and/or another disable action for the function that will subsequently be invoked (e.g., after a predetermined period of time or after the battery capacity is further diminished by some predetermined amount). Following actions 508 and 512, as well as following decision 510 when the overridden function is not to be deferred, disable override process 500 is complete and processing returns to action 418 of power consumption management process 400 illustrated in FIG. 4.

In one embodiment, the electronic device, i.e., portable media device, makes use of a graphical user interface to assist the user with configuring preferences (e.g., power preferences). In one embodiment, the user can use the graphical user interface to configure the preferences to provide management of power consumption. For example, the preferences can indicate conditional rules upon which actions are performed. The conditional rules can use usage rules, functional priorities, or usage priorities. For example, the user may desire to have notifications presented in a visual manner. Alternatively, or in addition, the user may desire notifications be provided in an audio manner via a device speaker, an earphone or headphone (or headset). One example of a user-provided preference is a directive to maintain or preserve at least a duration (e.g., 1 hour) of available call talk time. Further, the user-provided preference can specify that the user is to be notified when the available call talk time falls below a user-specified duration. Alternatively or additionally, the user-provided preference can specify that one or more other available functions on the electronic device are to be disabled when the available call talk time falls below a user-specified duration. Another example of a user-provided preference is a directive to maintain or preserve at least a duration (e.g., 24 hours) of available call standby time. Still another example of a user-provided preference is a directive to maintain or preserve at least a duration (e.g., 2 hours) of available media playback time. The user preferences can include multiple directives or conditional rules that are used separately or in combination. The conditional rules can also be set in the electronic device as a default without user preferences. A remote service provider or network provider can also operate to control the applicable conditional rules on an electronic device from a remote location.

Instead of utilizing user preferences to provide management of power consumption, power management can utilize usage history of the electronic device to estimate future usage requirements. The electronic device can then take various actions in view of the future usage requirements so that more important functions of the electronic device can be preserved, whereby the future usage requirements of the more important functions are more likely to be satisfied.

A graphical user interface can be provided by an electronic device, namely, a portable electronic device that supports power consumption management. The graphical user interface can take various forms to assist users in setting one or more user preferences that can be utilized by the electronic device to provide power consumption management.

FIG. 6 illustrates graphical user interface 600 according to one embodiment of the invention. Graphical user interface 600 can allow a user to configure a portable electronic device for power consumption management. In this embodiment, user preferences can be configured by a user through use of graphical user interface 600. The user preferences, in this embodiment, are usage preferences that specify usage rules that a user would like the electronic device to utilize when providing power consumption management. The usage rules illustrated in FIG. 6 can be based on a condition regarding operational times for applications supported by the electronic device. For example, as shown in FIG. 6, a condition can be dependent upon available media playback time or available call time. The usage rules illustrated in FIG. 6 can also specify a duration to be compared with the available operational times. For example, as shown in FIG. 6, the duration can be selected from a number of predetermined durations, such as 60 minutes, 30 minutes or 15 minutes. Still further, the usage rules illustrated in FIG. 6 can specify an action that is to result from the condition being satisfied with respect to the duration. The actions illustrated in FIG. 6 are to notify the user or to disable an application. In the case in which an application is to be disabled, the user can specify a function (e.g., application) to be disabled. As illustrated in FIG. 6, the available functions can be listed and the user can select therefrom. As shown in FIG. 6, the user can disable media playback and/or wireless data network usage. Also, it should be noted that although graphical user interface 600 utilize selectors (e.g., radio buttons) to assist a user in configuring a usage rule, various other approaches or user interface controls (text box, combo box, drop-down lists, etc.) can be alternatively utilized to configure a usage rule.

The electronic device as described herein can be a wireless communication device (e.g., portable telephone) capable of communication over a network. The wireless communication device can also include other applications such as a media playback application.

The electronic device as described herein can be a media device (e.g., media player) capable of playing (including displaying) media items. The media items can pertain to audio items (e.g., audio files or songs), videos (e.g., movies) or images (e.g., photos). The media device can also include other applications such as a wireless communication application.

Figure 7:
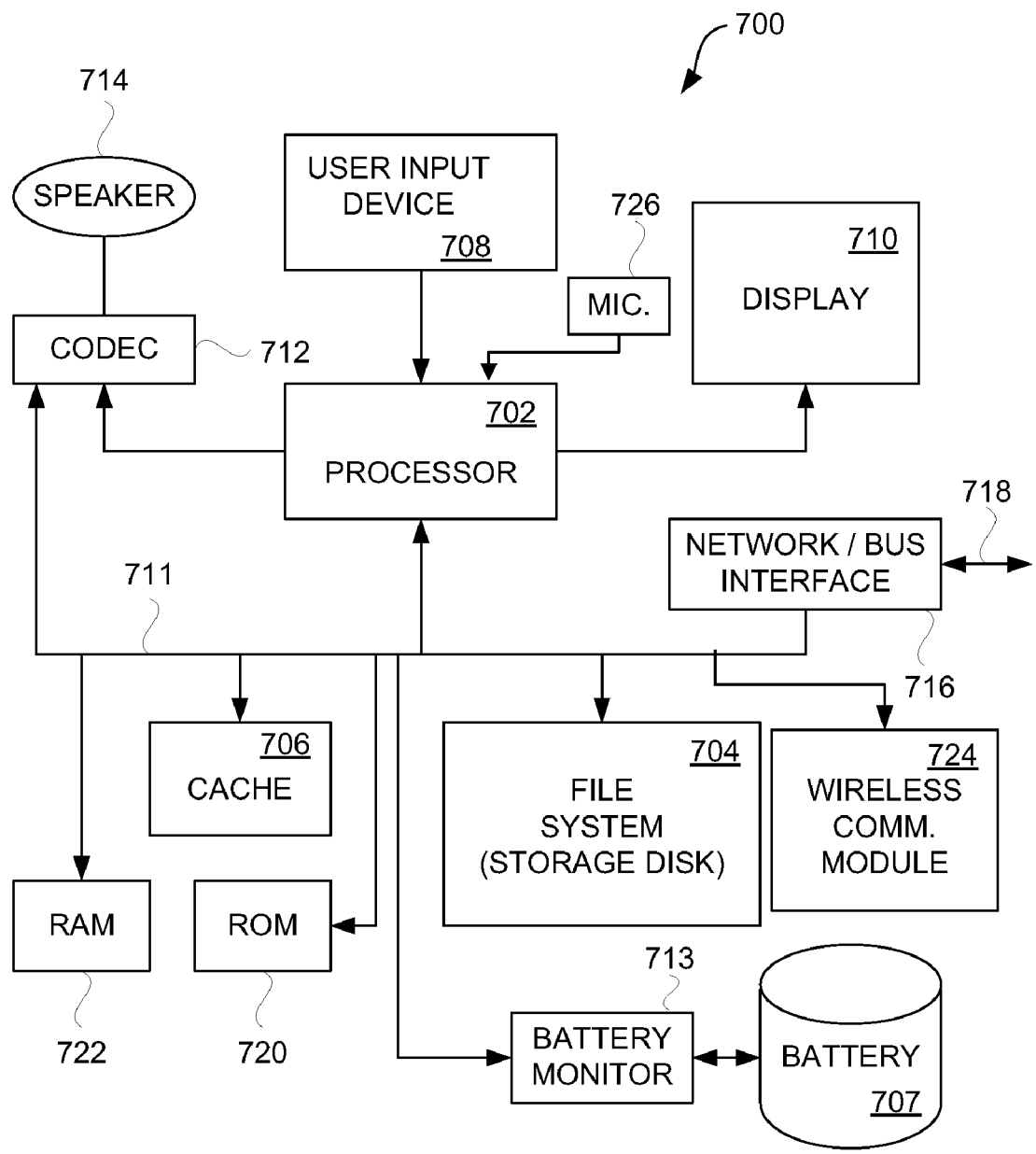
FIG. 7 is a block diagram of a media player according to one embodiment of the invention.

FIG. 7 is a block diagram of media player 700 according to one embodiment of the invention. Media player 700 can include the circuitry of the power monitoring system 100 in FIG. 1 and/or can perform the operations described with reference to FIGS. 2-5.

Media player 700 can include a processor 702 that pertains to a microprocessor or controller for controlling the overall operation of media player 700. Media player 700 can stores media data pertaining to media items in file system 704 and cache 706. File system 704 is, typically, a storage disk or a plurality of disks. File system 704 typically provides high capacity storage capability for media player 700. File system 704 can store not only media data but also non-media data (e.g., when operated in a disk mode). However, since the access time to file system 704 is relatively slow, media player 700 can also include cache 706. Cache 706 is, for example, Random-Access Memory (RAM) provided by semiconductor memory. The relative access time to cache 706 is substantially shorter than for file system 704. However, cache 706 does not have the large storage capacity of file system 704. Further, file system 704, when active, consumes more power than does cache 706. The power consumption is often a concern when media player 700 is a portable media player that is powered by battery 707. Media player 700 also includes RAM 720 and Read-Only Memory (ROM) 722. ROM 722 can store programs, utilities or processes to be executed in a non-volatile manner. RAM 720 provides volatile data storage, such as for cache 706.

Media player 700 also includes user input device 708 that allows a user of media player 700 to interact with media player 700. For example, user input device 708 can take a variety of forms, such as a button, keypad, dial, etc. (physical or soft implementations) each of which can be programmed to individually or in combination perform any of a suite of functions. In one implementation, user input device 708 can be provided by a dial that physically rotates. In another implementation, user input device 708 can be implemented as a touchpad (i.e., a touch-sensitive surface). In still another implementation, user input device 708 can be implemented as a combination of one or more physical buttons as well as a touchpad. Still further, media player 700 includes display 710 (screen display) that can be controlled by processor 702 to display information to the user. Data bus 711 can facilitate data transfer between at least file system 704, cache 706, processor 702, and CODEC 712.

Media player 700 also provides status monitoring of battery 707. In this regard, media player 700 includes battery monitor 713. Battery monitor 713 operatively couples to battery 707 to monitor is conditions. Battery monitor 713 can communicate battery status (or conditions) with processor 702.

In one embodiment, media player 700 serves to store a plurality of media items (e.g., songs) in file system 704. When a user desires to have media player 700 play a particular media item, a list of available media items is displayed on display 710. Then, using user input device 708, a user can select one of the available media items. Processor 702, upon receiving a selection of a particular media item, supplies the media data (e.g., audio file) for the particular media item to coder/decoder (CODEC) 712. CODEC 712 then produces analog output signals for speaker 714. Speaker 714 can be a speaker internal to media player 700 or external to media player 700. For example, headphones or earphones that connect to media player 700 would be considered an external speaker. Speaker 714 can not only be used to output audio sounds pertaining to the media item being played, but also to output audio notifications pertaining to battery status. Notifications of battery status can also be output to display 710.

User input device 708 can take a variety of forms, such as a button, keypad, dial, etc. (physical or soft implementations) each of which can be programmed to individually or in combination perform any of a suite of functions.

In one embodiment, media player 700 is a portable computing device that supports processing media such as audio. For example, media player 700 can be a music player (e.g., MP3 player), a game player, and the like. These devices are generally battery operated and highly portable so as to allow a user to listen to music, play games or video, record video or take pictures wherever the user travels. In one implementation, media player 700 is a handheld device that is sized for placement into a pocket or hand of the user. By being handheld, media player 700 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Media player 700 also includes network/bus interface 716 that couples to data link 718. Data link 718 allows media player 700 to couple to a host computer. Data link 718 can be provided over a wired connection or a wireless connection. In the case of a wireless connection, network/bus interface 716 can include a wireless transceiver.

To support wireless communications, media player 700 can also include wireless communications module 724. Wireless communication module 724 can be considered to provide voice communications (e.g., calls via a cellular network), whereas network/bus interface 716 can be considered to provide data communications. A user of media player 700 can thus make and receive voice calls using the wireless communications module in media player 700. Wireless communications module 724 can also couple to data bus 711 to couple to processor 702 and other resources. Media player 700 can also include microphone 726 for pickup of the user's voice.

The invention is suitable for use with battery-powered electronic devices. However, the invention is particularly well suited for handheld electronic devices, such as a handheld media device. One example of a handheld media device is a portable media player (e.g., music player or MP3 player). Another example of a handheld media device is a mobile telephone (e.g., cell phone) or Personal Digital Assistant (PDA).

Portable media devices can store and play audio sounds pertaining to media assets (media items), such as music, audiobooks, meeting recordings, and other speech or voice recordings. Portable media devices, such as media players, are small and highly portable and have limited processing resources. Often, portable media devices are handheld media devices which can be easily held by and within a single hand of a user.

One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to utilize and manage media assets. One example of a media management application is iTunes®, produced by Apple Computer, Inc.

U.S. patent application Ser. No. 11/209,367, filed Aug. 22, 2005, and entitled "AUDIO STATUS INFORMATION FOR A PORTABLE ELECTRONIC DEVICE," is hereby incorporated herein by reference.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a multi-function electronic device can operate to preserve one of its functions over another when available battery power is diminished. Another advantage of the invention is that a user of a multi-function electronic device can participate in configuring behavior of the multi-function device when available battery power is diminished.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for optimizing battery usage of a battery powered electronic device, the electronic device supporting a plurality of different functions, the electronic device in communication with a remote service provider by way of a wireless network, the method comprising:
   receiving a conditional rule for management of power consumption on the electronic device from the remote service provider;
   operating the electronic device to provide one or more of a plurality of different functions in accordance with the received conditional rule;
   monitoring the battery of the electronic device to obtain battery status information; analyzing the battery status information in relation to future power requirements of a plurality of applications associated with a electronic device wherein the certain future power requirements are estimated from usage history;
   comparing the analyzed battery status information with the conditional rule for management of power consumption received from the remote service provider;
   generating a disable action based upon the comparing, the disable action arranged to disable at least one application executed by the electronic device;
   determining whether to provide an override prompt;
   presenting the override prompt to the user of the battery powered electronic device, the override prompt allowing the user of the portable electronic device to override the disable action;
   disabling the at least one application when the override prompt is not selected; and
   preserving electronic device functionality by directing available battery charge to the provided one or more of the plurality of different applications when the user has requested an override of the disable action.

2. The method as recited in claim 1, wherein the electronic device supports media playback and wireless voice communication.

3. The method as recited in claim 1, wherein the electronic device is a handheld electronic device, a miniature electronic device, or a wearable electronic device.

4. A non-transitory computer readable medium including at least computer program code for optimizing battery usage of a battery powered portable electronic device, the portable electronic device supporting a plurality of different applications, the electronic device in communication with a remote service provider by way of a wireless network, the computer readable medium comprising:
   computer program code for receiving a conditional rule for management of power consumption on the electronic device from the remote service provider;
   computer program code for operating the portable electronic device to provide one or more of a plurality of different functions in accordance with the received conditional rule;
   computer program code for monitoring the battery of the portable electronic device to obtain battery status information;
   computer program code analyzing the battery status information in relation to future power requirements of a plurality of applications associated with the electronic device wherein the certain future power requirements are estimated from usage history;
   computer program code for comparing the analyzed battery status information with the conditional rule for management of power consumption received from the remote service provider;
   computer program code for generating a disable action based upon the comparing, the disable action arranged to disable at least one application executed by the electronic device;
   computer program code for determining whether to provide an override prompt;
   computer code for presenting the override prompt to the user of the battery powered electronic device, the override prompt allowing the user of the portable electronic device to override the disable action;
   disabling the least one application when the override prompt is not selected; and
   computer code for preserving electronic device functionality by directing available battery charge to the provided one or more of the plurality of different applications when the user has requested an override of the disable action.

5. A multi-application handheld electronic device in which power management can be provided on an application basis, the multi-application electronic device in communication with a remote service provider by way of a wireless network, the multi-application handheld electronic device comprising:
   a display;
   a battery;
   a battery monitor configured to acquire battery status information from the battery; and a processor operatively connected to the battery monitor, the processor configured to receive a conditional rule for management of power consumption on the multi-application hand-held electronic device from the remote service provider, receive the battery status information from the battery monitor, analyze the battery status information in relation to future power requirements of a plurality of applications associated with the multi-application handheld electronic device wherein the certain future power requirements are estimated from usage history and wherein the analysis is based upon the received conditional rule from the remote service provider, compare the analyzed battery status information with the conditional rule for management of power consumption received from the remote service provider; generate a disable action based upon the comparing, the disable action arranged to disable at least one application executed by the electronic multi-application handheld device; determine whether to provide an override prompt; present the override prompt to the user of the battery powered multi-application handheld electronic device, the override prompt allowing the user of the multi-application handheld electronic device to override the disable action, preserve electronic device functionality, and disable the least one application when the override prompt is not selected.

6. The multi-application handheld electronic device as recited in claim 5, wherein the multi-application handheld electronic device supports at least a media playback application and a wireless voice communication application.

7. The multi-application handheld electronic device as recited in claim 6, wherein, when the battery status indicates that the battery is diminished, the processor is further configured to disable the media playback application so that a usage duration of the wireless voice communication application is extended.

8. The multi-application handheld electronic device as recited in claim 5, wherein the multi-application handheld electronic device is configured to prefer usage of a wireless voice communication application over a media playback application.

* * * * *